United States Patent
Yin et al.

(10) Patent No.: US 11,697,970 B2
(45) Date of Patent: Jul. 11, 2023

(54) DIRECTLY CONNECTED DRILL PIPE APPLICABLE TO EXTREME CONDITIONS

(71) Applicant: Institute of Exploration Techniques, Chinese Academy of Geological Sciences, Tianjin (CN)

(72) Inventors: Hao Yin, Tianjin (CN); Jian Liang, Tianjin (CN); Xinmiao Li, Tianjin (CN); Jianhua Sun, Tianjin (CN); Kuan Li, Tianjin (CN); Xiumei Liu, Tianjin (CN)

(73) Assignee: INSTITUTE OF EXPLORATION TECHNIQUES, CHINESE ACADEMY OF GEOLOGICAL SCIENCES, Tianjin (CN)

( * ) Notice: Subject to any disclaimer, the term of this patent is extended or adjusted under 35 U.S.C. 154(b) by 68 days.

(21) Appl. No.: 17/152,187

(22) Filed: Jan. 19, 2021

(65) Prior Publication Data
US 2021/0222500 A1    Jul. 22, 2021
US 2022/0106841 A9    Apr. 7, 2022

(30) Foreign Application Priority Data

Jan. 19, 2020 (CN) .......................... 202010059548.9

(51) Int. Cl.
| | | |
|---|---|---|
| E21B 17/042 | (2006.01) | |
| E21B 17/046 | (2006.01) | |
| F16L 15/00 | (2006.01) | |
| F16L 15/04 | (2006.01) | |

(52) U.S. Cl.
CPC .......... E21B 17/042 (2013.01); E21B 17/046 (2013.01); F16L 15/001 (2013.01); F16L 15/04 (2013.01)

(58) Field of Classification Search
CPC ......... F16L 15/001; F16L 15/04; F16L 15/08; E21B 17/046; E21B 17/042
See application file for complete search history.

(56) References Cited

U.S. PATENT DOCUMENTS

| 1,474,905 | A | * | 11/1923 | Keszthelyi | .............. | F16L 15/08 |
| | | | | | | 285/333 |
| 5,709,416 | A | * | 1/1998 | Wood | .................... | E21B 17/042 |
| | | | | | | 285/333 |
| 9,239,122 | B2 | * | 1/2016 | Pollack | ................. | E21B 17/042 |

(Continued)

*Primary Examiner* — David Bochna
(74) *Attorney, Agent, or Firm* — Goodhue, Coleman & Owens, P.C.

(57) ABSTRACT

A directly connected drill pipe applicable to extreme conditions includes a tool joint pin and a tool joint box, where an external pipe section is located on an external side of a threaded section of the tool joint pin, and an annular groove is formed between the external pipe section and the threaded section of the tool joint pin. An insertion section of the tool joint box can be inserted into the annular groove in a matched manner. A main shoulder of the tool joint pin is located at an end of the external pipe section, a main auxiliary shoulder of the tool joint pin is located on a bottom surface of the annular groove, and an auxiliary shoulder of the tool joint pin is located at a small end of the tool joint pin. The tool joint box has three corresponding shoulders which form a 3-stage sealing with the tool joint pin.

13 Claims, 4 Drawing Sheets

(56) References Cited

U.S. PATENT DOCUMENTS

| | | | |
|---|---|---|---|
| 2008/0238094 A1* | 10/2008 | Craig | E21B 17/042 |
| | | | 285/332 |
| 2012/0068458 A1* | 3/2012 | Granger | E21B 17/042 |
| | | | 285/390 |
| 2013/0033035 A1* | 2/2013 | Gallagher | E21B 17/042 |
| | | | 285/332.2 |
| 2014/0265320 A1* | 9/2014 | Pollack | E21B 17/042 |
| | | | 285/334 |
| 2018/0051836 A1* | 2/2018 | Wajnikonis | E21B 17/046 |
| 2018/0106115 A1* | 4/2018 | Pollack | E21B 17/042 |

\* cited by examiner

DIRECTLY CONNECTED DRILL PIPE APPLICABLE TO EXTREME CONDITIONS

CROSS REFERENCE TO RELATED APPLICATIONS

This application claims priority under 35 U.S.C. § 119 to Chinese Application Serial No. 202010059548.9 filed on Jan. 19, 2020, which is incorporated by reference in its entirely.

TECHNICAL FIELD

The present disclosure relates to a device for drilling, in particular to a directly connected drill pipe applicable to extreme conditions.

BACKGROUND

Drill pipes are widely used for drilling through the earth's surface to a bottom hole during drilling, and can transport mud, transmit torque, and serve as a sealing gasket. Due to a complex stress state of the drill pipes, the failure of the drill pipes becomes one of main downhole accidents and is mainly caused by tool joints. With the rise of scientific ultra-deep drilling and scientific deep-sea drilling in recent years, higher performance of the drill pipes is required under extreme conditions such as high temperatures, high pressures, large stresses, and the lack of marine risers. Conventional drill pipes have not been suitable for severe operation conditions. A reason for this is that swelling of tool joint boxes, seal failures of shoulders, mismatch of threads, root fractures, and other accidents occur frequently, and especially, sealing performance of tool joints of the drill pipes used at high pressure and a large bending moment (without the marine risers) becomes a key factor preventing performance of the drill pipes from being improved. Therefore, it is urgent to improve mechanical properties, such as torsion resistance and bending resistance, of the tool joints.

SUMMARY

The present disclosure aims to provide a directly connected drill pipe applicable to extreme conditions, which has good sealing effects and high mechanical properties such as torsion resistance and bending resistance.

The present disclosure is fulfilled through the following technical solution:

A directly connected drill pipe applicable to extreme conditions includes a drill pipe body, a tool joint pin, and a tool joint box connected to the tool joint pin through tapered pipe threads, where an external pipe section is located on an external side of a tapered pipe thread section of the tool joint pin, and an annular groove is formed between the external pipe section and the tapered pipe thread section of the tool joint pin; an insertion section of the tool joint box can be inserted into the annular groove in the tool joint pin in a matched manner; a main shoulder of the tool joint pin is located at an end of the external pipe section of the tool joint pin, a main auxiliary shoulder of the tool joint pin is located on a bottom surface of the annular groove in the tool joint pin, and an auxiliary shoulder of the tool joint pin is located at a small tapered pipe thread end of the tool joint pin; a main shoulder of the tool joint box is located on a bottom surface of the insertion section of the tool joint box, a main auxiliary shoulder of the tool joint box is located at a large tapered pipe thread end of the tool joint box, and an auxiliary shoulder of the tool joint box is located on a bottom surface of a small tapered pipe thread end of the tool joint box; and in a case where the tool joint pin is connected into the tool joint box, a main sealing surface is formed by means of a close fit between the main shoulder of the tool joint pin and the main shoulder of the tool joint box, a main auxiliary sealing surface is formed by means of a close fit between the main auxiliary shoulder of the tool joint pin and the main auxiliary shoulder of the tool joint box, and an auxiliary sealing surface is formed by means of a close fit between the auxiliary shoulder of the tool joint pin and the auxiliary shoulder of the tool joint box.

According to the directly connected drill pipe applicable to extreme conditions, the tool joint pin may be integrally connected to the corresponding drill pipe body, and the annular groove may extend from the middle of the tapered pipe thread section of the tool joint pin to the bottom of the tapered pipe thread section of the tool joint pin; and furthermore, the tool joint box may be integrally connected to the corresponding drill pipe body, and the insertion section may extend from the large tapered pipe thread end of the tool joint box to the middle of a tapered pipe thread section of the tool joint box.

According to the directly connected drill pipe applicable to extreme conditions, an axial length of the annular groove may be denoted by L1, and an axial length of the insertion section may be denoted by L2, where may be L1>L2, and S1=L1−L2; and moreover, an axial length from the main auxiliary shoulder of the tool joint pin to the small end of the tool joint pin may be denoted by L3, and an axial length from the auxiliary shoulder of the tool joint box to the large end of the tool joint box may be denoted by L4, where may be L3>L4, S2=L3−L4, and S1<S2.

According to the directly connected drill pipe applicable to extreme conditions, a groove, having spiral protrusions, in the main shoulder of the tool joint pin and a groove, having spiral protrusions, in the main shoulder of the tool joint box may be screwed into each other and may also be meshed with each other for a connection in an interference fit manner.

According to the directly connected drill pipe applicable to extreme conditions, an internal wall of the annular groove in the tool joint pin may be in close fit with an external wall of the insertion section of the tool joint box.

According to the directly connected drill pipe applicable to extreme conditions, S1 may be ranged from 0.01 P to 0.05 P, and S2 may be ranged from 0.02 P to 0.1 P; and furthermore, may be S2=2*S1.

According to the directly connected drill pipe applicable to extreme conditions, the groove, having the spiral protrusions, in the main shoulder of the tool joint pin may have the same initial phase angle as the groove, having the spiral protrusions, in the main shoulder of the tool joint box, and have a final phase angle greater than that of the groove, having the spiral protrusions, in the main shoulder of the tool joint box, by an angle θ of 30°-45°.

According to the present disclosure, to improve sealing performance, torsion resistance, and bending resistance of a tool joint at a high pressure and a large bending moment, a tool joint with three sealing surfaces of shoulders is designed by breaking through the design idea of a traditional tool joint. By design of sealing surfaces of the three-step shoulder in combination with an axial sealing surface, the sealing performance of the tool joint can be significantly improved, so that the sealing capability of the drill pipe at the high pressure under extreme conditions is improved, and concentration of stresses of threads in a conventional structure is avoided; and furthermore, spiral teeth on surfaces of the main shoulders are meshed for a connection to provide a radial pre-tightening force, so that stresses of the threads are uniformly distributed, thus improving the capability of the drill pipe to resist large bending deformation and torsional deformation. In addition, the tool joint pin as well as the tool joint box is integrally connected to the corresponding drill pipe body, so that weak stressed points of the drill pipe are decreased. This tool joint can be widely used for metal drill pipes and greatly lower the probability of swelling and mismatch of the threads, seal failures, root fractures, and the like of titanium alloy drill pipes with a low modulus of elasticity.

BRIEF DESCRIPTION OF DRAWINGS

The present disclosure is explained in detail below with reference to the accompanying drawings.

Figure 1:
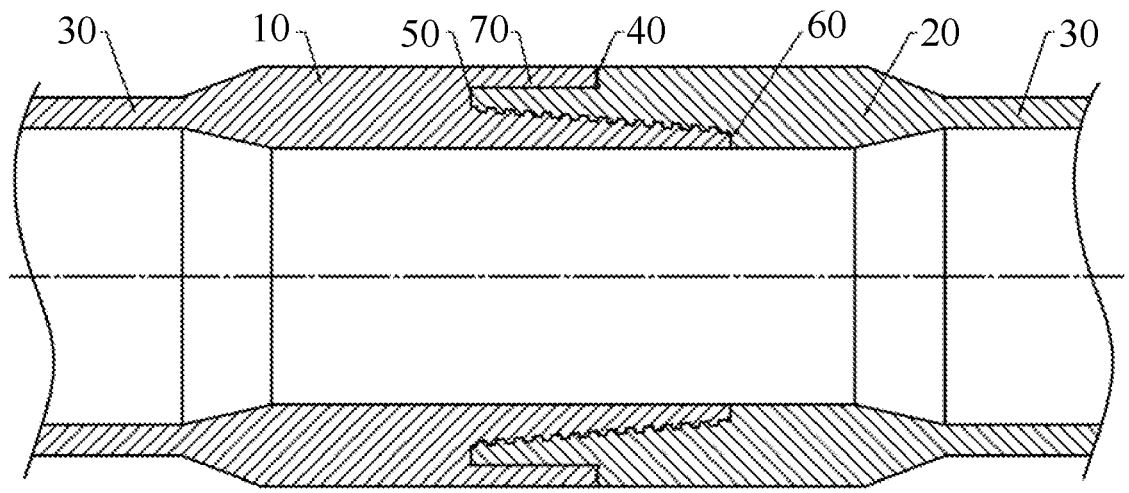
FIG. 1 is a section view of a structural diagram of the present disclosure.

In the figures the following reference numerals and corresponding features are shown, namely: axial length 1 (L1), axial length 2 (L2), axial length 3 (L3), axial length (L4), tool joint pin 10, annular groove 11, main shoulder of the tool joint pin 12, main auxiliary shoulder of the tool joint pin 13, auxiliary shoulder of the tool joint pin 14, groove, having spiral protrusions, in the main shoulder of the tool joint pin 15, tool joint box 20, insertion section 21, main shoulder of the tool joint box 22, main auxiliary shoulder of the tool joint box 23, auxiliary shoulder of the tool joint box 24, groove, having spiral protrusions, in the main shoulder of the tool joint box 25, drill pipe body 3, main sealing surface 4, main auxiliary sealing surface 5, auxiliary sealing surface 6, axial sealing section 7, external pipe section 16, tapered pipe thread section 17, small tapered pipe thread end 18, large tapered pipe thread end 26, tapered pipe thread section 27, and small tapered pipe thread end 28.

DETAILED DESCRIPTION

Figure 2:
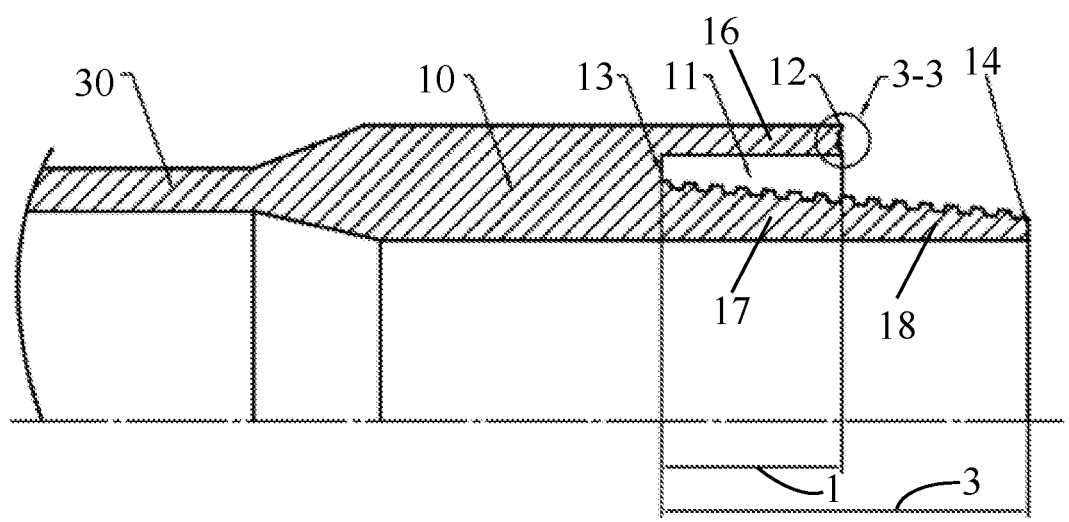
FIG. 2 is a structural diagram of a tool joint pin shown in FIG. 1.
Figure 3:
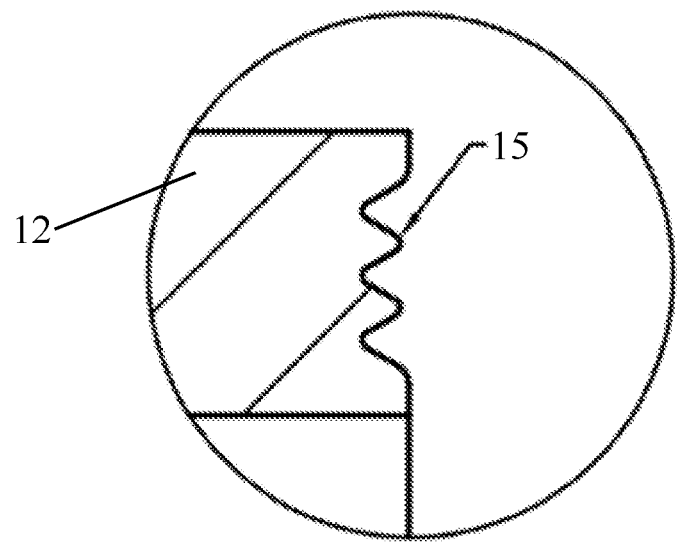
FIG. 3 is a partial enlarged view taken along line 3-3 in FIG. 2.
Figure 4:
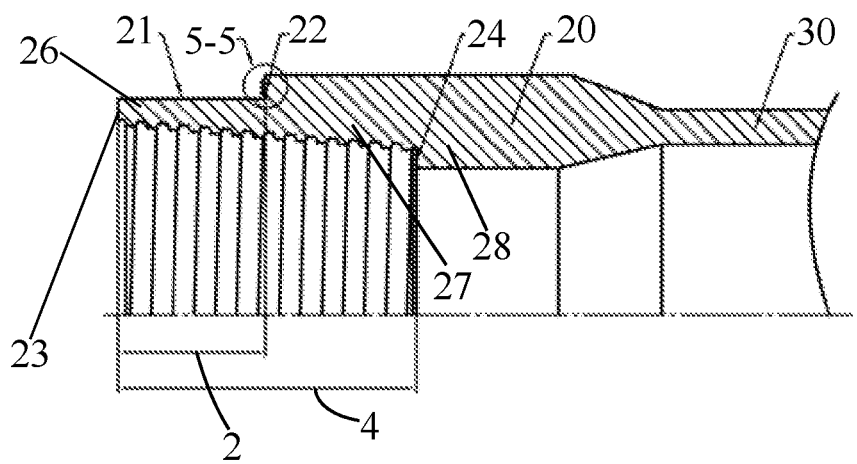
FIG. 4 is a structural diagram of a tool joint box shown in FIG. 1.
Figure 5:
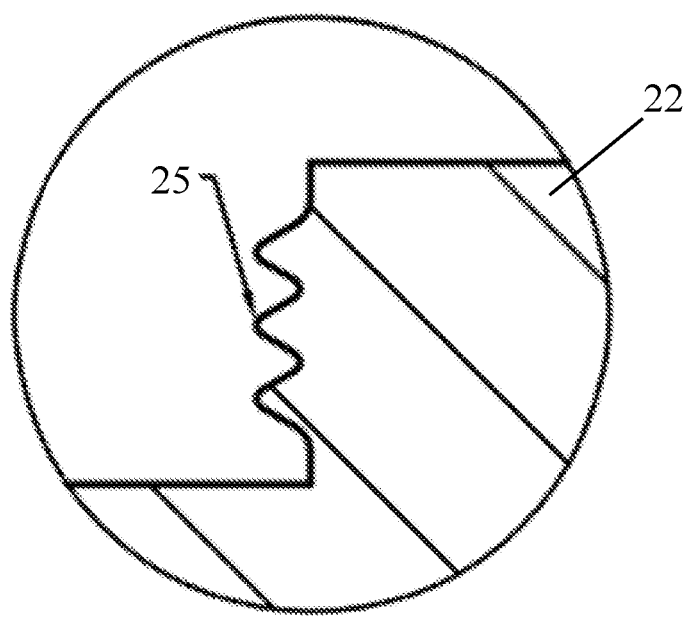
FIG. 5 is a partial enlarged view taken along line 4-4 in FIG. 4.

Referring to FIG. 1, FIG. 2, and FIG. 4, a directly connected drill pipe applicable to extreme conditions includes a drill pipe body 30, a tool joint pin 10, and a tool joint box 20 connected to the tool joint pin 10 through tapered pipe threads, where the tool joint pin 10 as well as the tool joint box 20 is integrally connected to the corresponding drill pipe body 30, so that weak points of a drill string are decreased, and overall safety of the drill string is improved. An external pipe section 16 is located on an external side of a tapered pipe thread section 17 of the tool joint pin 10, and an annular groove 11 is formed between the external pipe section 16 and the tapered pipe thread section 17 of the tool joint pin 10 and extends from the middle of the tapered pipe thread section 17 of the tool joint pin 10 to at bottom surface of the tapered pipe thread section 17 of the tool joint pin 10. An insertion section 21 of the tool joint box 20 extends from a large tapered pipe thread end 26 of the tool joint box 20 to the middle of a tapered pipe thread section 27 of the tool joint box 20, and can be inserted into the annular groove 11 in the tool joint 10 pin in a matched manner. A main shoulder 12 of the tool joint pin 10 is located at an end of the external pipe section 16 of the tool joint pin 10. A main auxiliary shoulder 13 of the tool joint pin 10 is located on the bottom surface of the annular groove 11 in the tool joint pin 10, and an auxiliary shoulder 14 of the tool joint pin 10 is located at a small tapered pipe thread end 18 of the tool joint pin 10. A main shoulder 22 of the tool joint box 20 is located on a bottom surface of the insertion section 21 of the tool joint box 20, a main auxiliary shoulder 23 of the tool joint box 20 is located at the large tapered pipe thread end 26 of the tool joint box 20, and an auxiliary shoulder 24 of the tool joint box 20 is located on a bottom surface of a small tapered pipe thread end 28 of the tool joint box 20. And, in a case where the tool joint pin 10 is connected into the tool joint box 20, a main sealing surface 40 is formed by a close fit between the main shoulder 12 of the tool joint pin 10 and the main shoulder 22 of the tool joint box 20, a main auxiliary sealing surface 50 is formed by a close fit between the main auxiliary shoulder 13 of the tool joint pin 10 and the main auxiliary shoulder 23 of the tool joint box 20, and an auxiliary sealing surface 60 is formed by a close fit between the auxiliary shoulder 14 of the tool joint pin 10 and the auxiliary shoulder 24 of the tool joint box 20. In this unique three-step sealing structure, sealing performance is greatly improved by virtue of sealing of surfaces of the main shoulders 12, 22, the main auxiliary shoulders 13, 23, and the auxiliary shoulders 14, 24, so that sealing required by high-pressure operation can be achieved. A contact position of the main shoulders 12, 22 is removed to a corresponding position of the middle of the tapered pipe thread sections 17, 27, and an axial length L1 of the main shoulder 12 of the tool joint pin 10 is increased, so that axial surfaces of the shoulders 12, 22 of the tool joint pin 10 and the tool joint box 20 are inserted into each other in a matched manner before the tool joint pin 10 and the tool joint box 20 are screwed into each other, and in this way, the threads of the tool joint pin 10 and the tool joint box 20 are coaxial and can be screwed more smoothly without being mismatched or stuck due to misalignment. Moreover, multiple shoulders 12, 22, 13, 23, 14, 24 are configured to avoid a concentration of stresses of the threads, so that the stresses of the threads are distributed more uniformly, and higher torsion resistance and higher bending resistance are achieved. When the threads of the tool joint pin 10 are screwed into the threads of the tool joint box 20, the main shoulders 12, 22 contact with each other first; then the main auxiliary shoulders 13, 23 contact with each other; and finally, the auxiliary shoulders 14, 24 contact with each other. Particularly, in the screwing process of the tool joint pin 10 and the tool joint box 20, the main shoulders 12, 22 contact with each other first; then the tool joint pin 10 and the tool joint box 20 are continuously screwed till the main auxiliary shoulders 13, 23 contact with each other, and meanwhile, stresses of the threads are larger in the middle and smaller in the two ends in an axial direction due to a limitation of the main shoulders 12, 22. With continuous screwing of the tool joint pin 10 and the tool joint box 20, the main auxiliary shoulders 13, 23 contact with each other. After that, the tool joint pin 10 and the tool joint box 20 are continuously screwed till the auxiliary shoulders 14, 24 contact with each other, and meanwhile, stresses of the threads are larger in a left side and smaller in a right side in the axial direction due to a limitation of the main auxiliary shoulders 13, 23. And finally, the tool joint pin 10 and the tool joint box 20 are continuously screwed by a certain angle of rotation after the auxiliary shoulders 14, 24 contact with each other, and meanwhile, stresses of the threads are larger in the right side and smaller in the left side in the axial direction due to a limitation of the auxiliary shoulders 14, 24. Where, superposition of these stresses of the threads can avoid concentration of stresses of threads in a conventional structure. In addition, an axial length 1 of the annular groove 11 is denoted by L1, and an axial length 2 of the insertion section 21 is denoted by L2, where L1>L2. An axial length 3 from the main auxiliary shoulder 13 of the tool joint pin 10 to the auxiliary shoulder 14 of the tool joint pin 10 is denoted by L3, and an axial length 4 from the auxiliary shoulder 24 of the tool joint box 30 to the main auxiliary shoulder 23 of the tool joint box 20 is denoted by L4, where L3>L4. And furthermore, S1=L1−L2, S2=L3−L4, and S1<S2. Based on experience, S1 ranges from 0.01 P to 0.05 P, and S2 ranges from 0.02 P to 0.1 P (P represents a pitch of the tapered pipe threads); and furthermore, S2=2*S1, so that a contact sequence of the main shoulders 12, 22, the main auxiliary shoulders 13, 23, and the auxiliary shoulders 14, 24 is guaranteed.

Referring to FIG. 1, a main sealing surface 40 is formed by a close fit between an internal wall of the annular groove 11 in the tool joint pin 10 and an external wall of the insertion section 21 of the tool joint box 20. And in this way, an axial sealing section 70 is added based on sealing of the main shoulders 12, 22, the main auxiliary shoulders 13, 23, and the auxiliary shoulders 14, 24 to guarantee a tight connection. The axial sealing section 70 can improve the sealing performance of the tool joint pin 10 and the tool joint box 20, and its path is increasingly long with narrowing of a gap, such that a sealed channel has increasingly large resistance. Moreover, when each connector bears a bending moment, the axial sealing section 70 increases the bending resistance of the connectors, so that the influence of the bending moment on the threads is reduced.

Referring to FIGS. 2-5, a groove 15, having spiral protrusions, in the main shoulder 12 of the tool joint pin 10 and a groove 25, having spiral protrusions, in the main shoulder 22 of the tool joint box 20 can be screwed into each other and can also be meshed with each other for a connection in an interference fit manner. The grooves 15, 25 in surfaces of the main shoulders 12, 22 have triangular spiral protrusions. When the main shoulder 12 of the tool joint pin 10 is in contact with the main shoulder 22 of the tool joint box 20 through the surfaces, the grooves 15, 25 having the triangular spiral protrusions are screwed into each other, so that a force towards a center is generated, that is, a certain radial pre-tightening force is provided for a connection between the tapered pipe threads; and in this way, the main shoulders 12, 22 have higher torsion resistance and higher bending resistance, thus improving the capability of the drill pipe to cope with large bending deformation and large torque output.

Figure 6:
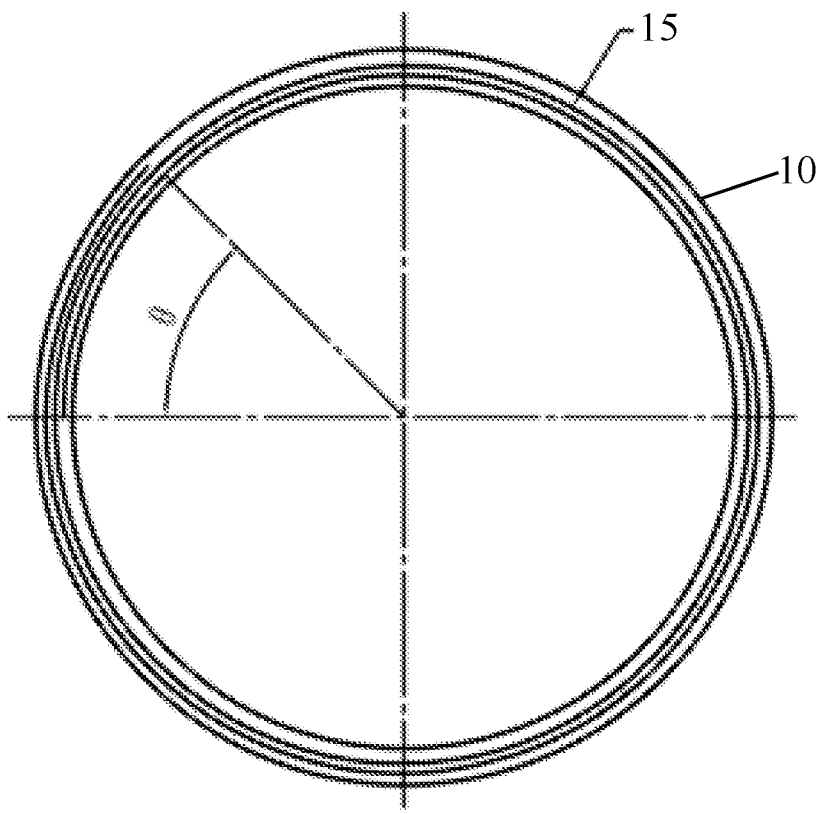
FIG. 6 is a distribution diagram of a groove, having spiral protrusions, in a main shoulder of the tool joint pin.
Figure 7:
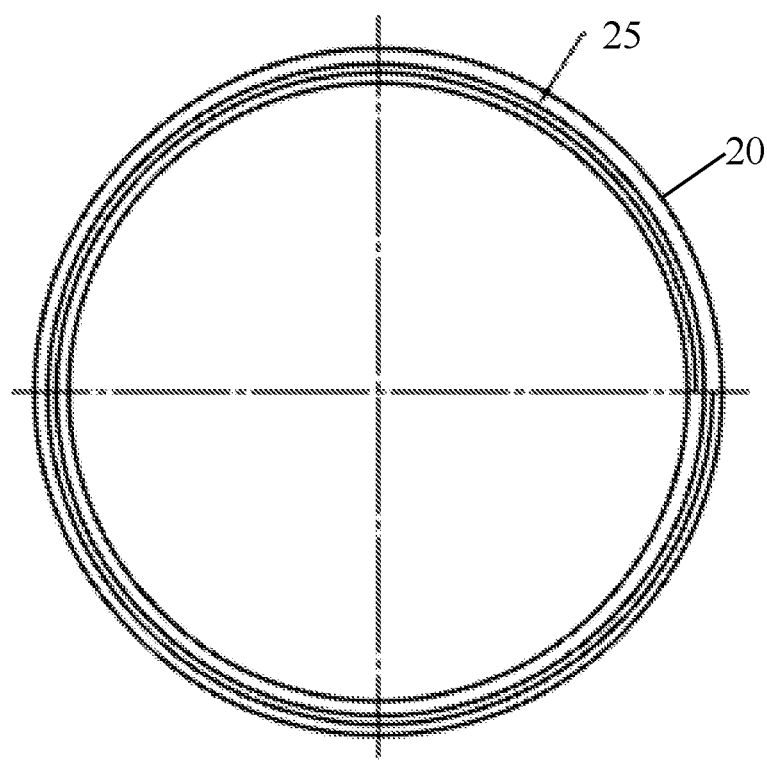
FIG. 7 is a distribution diagram of a groove, having spiral protrusions, in a main shoulder of the tool joint box.

Referring to FIG. 6 and FIG. 7, to achieve no interference of the pre-tightening force in the continuous screwing process, the groove 15, having the spiral protrusions, in the main shoulder 12 of the tool joint pin 10 has the same initial phase angle as the groove 25, having the spiral protrusions, in the main shoulder 22 of the tool joint box 20, and has a final phase angle greater than that of the groove 25, having the spiral protrusions, in the main shoulder 22 of the tool joint box 20 by an angle θ of 30°-45°.

What is claimed is:

1. A directly connected drill pipe, comprising:
    a tool joint pin having:
        an outer annular projection extending axially outwardly and terminating in a main shoulder;
        an inner annular projection extending axially outwardly and terminating in an auxiliary shoulder;
        an annular groove disposed between the outer annular projection and the inner annular projection, the annular groove extending axially inwardly and terminating in a bottom surface comprising a main auxiliary shoulder;
    a tool joint box having:
        an outer annular groove extending axially inwardly and terminating in a main shoulder;
        an inner annular groove extending axially inwardly and terminating in an auxiliary shoulder;
    an annular projection disposed between the outer annular groove and the inner annular groove, the annular projection extending axially outwardly and terminating in a main auxiliary shoulder;
    wherein a connection between the tool joint pin and the tool joint box comprises:
        the outer annular projection of the tool joint pin operably connected to the outer annular groove of the tool joint box;
        the inner annular projection of the tool joint pin operably connected to the inner annular groove of the tool joint box;
        the annular projection of the tool joint box operably connected to the annular groove of the tool joint pin;
    wherein the inner annular projection of the tool joint pin has a tapered profile extending from the auxiliary shoulder to the main auxiliary shoulder and the inner annular groove of the tool joint box has a tapered profile extending from the main auxiliary shoulder to the auxiliary shoulder;
    wherein the main shoulder of the outer annular projection and the main shoulder of the outer annular groove comprise threads operably connected during the connection between the tool joint pin and the tool joint box.

2. The drill pipe of claim 1, wherein the tapered profile of the inner annular projection of the tool joint pin comprises threads extending up to and between the main auxiliary shoulder and the auxiliary shoulder.

3. The drill pipe of claim 1, wherein the tapered profile of the inner annular groove of the tool joint box comprises threads extending up to and between the auxiliary shoulder and the main auxiliary shoulder.

4. The drill pipe of claim 1, wherein the auxiliary shoulder of the inner annular projection and the inner annular groove are operably sealed during the connection between the tool joint pin and the tool joint box.

5. The drill pipe of claim 1, wherein the main auxiliary shoulder of the annular projection and the main auxiliary shoulder of the annular groove are operably sealed during the connection between the tool joint pin and the tool joint box.

6. A directly connected drill pipe, comprising:
    a tool joint pin having:
        a main shoulder disposed on an outer annular projection;
        an auxiliary shoulder disposed on an inner annular projection;
        a main auxiliary shoulder disposed within an annular groove, wherein the annular groove is disposed between the outer annular projection and the inner annular projection;

threads disposed on the inner annular projection extending between the main auxiliary shoulder and the auxiliary shoulder;
a tool joint box having:
  a main shoulder disposed within an outer annular groove;
  an auxiliary shoulder disposed within an inner annular groove;
  a main auxiliary shoulder disposed on an annular projection;
  threads disposed on the inner annular groove extending between the auxiliary shoulder and the main auxiliary shoulder;
wherein a connection between the tool joint pin and the tool joint box comprises:
  a main shoulder connection between the main shoulder of the tool joint pin and the tool joint box;
  an auxiliary shoulder seal between the auxiliary shoulder of the tool joint pin and the tool joint box;
  a main auxiliary shoulder seal between the main auxiliary shoulder of the tool joint pin and the tool joint box;
wherein the main shoulder of the tool joint pin extends outward from the main auxiliary shoulder in at least partial covering relation to the threads extending between the main auxiliary shoulder and the main shoulder;
wherein the directly connected drill pipe further comprising:
threads disposed on the main shoulder of the tool joint pin and the main shoulder of the tool joint box for providing the main shoulder connection, wherein the threads are mated together when the tool joint pin and the tool joint box are connected.

7. The drill pipe of claim 6, wherein portions of the inner annular groove positioned directly opposite the outer annular groove comprise threads.

8. The drill pipe of claim 6, further comprising:
an annular groove sealing surface disposed within the annular groove and an annular projection sealing surface disposed on the annular projection, wherein the annular groove sealing surface and the annular projection sealing surface are mated together during the main shoulder connection and the main auxiliary shoulder seal.

9. The drill pipe of claim 6, further comprising:
a tapered profile of the inner annular projection extending up to and between the auxiliary shoulder and the main auxiliary shoulder of the tool joint pin;
a tapered profile of the inner annular groove extending up to and between the main auxiliary shoulder and the auxiliary shoulder of the tool joint box;
wherein the tapered profile of the tool joint pin and the tapered profile of the tool joint box mate together when the tool joint pin and the tool joint box are connected.

10. The drill pipe of claim 9, wherein:
the threads disposed on the inner annular projection extend between and terminate at the auxiliary shoulder and the main auxiliary shoulder of the tool joint pin;
the threads disposed on the inner annular groove extend between and terminate at the main auxiliary shoulder and the auxiliary shoulder of the tool joint box; and
the threads on the inner annular projection and the inner annular groove are mated together during the connection between the tool joint pin and the tool joint box.

11. A method of connecting drill pipe, comprising:
providing a tool joint pin having a main shoulder disposed on an outer annular projection, an auxiliary shoulder disposed on an inner annular projection, a main auxiliary shoulder disposed within an annular groove disposed between the outer annular projection and the inner outer projection, threads extending between the auxiliary shoulder and the main auxiliary shoulder on the inner annular projection of the tool joint pin, and a tool joint box having a main shoulder disposed within an outer annular groove, an auxiliary shoulder disposed within an inner annular groove, a main auxiliary shoulder disposed on an annular projection disposed between the inner annular groove and the outer annular groove, and threads extending between the main auxiliary shoulder and the auxiliary shoulder on the inner annular groove of the tool joint box;
connecting the tool joint pin and the tool joint box by:
  mating a main shoulder connection between the main shoulder of the tool joint pin and the tool joint box;
  mating a main auxiliary shoulder seal between the main auxiliary shoulder of the tool joint pin and the tool joint box; and
  mating an auxiliary shoulder seal between the auxiliary shoulder of the tool joint pin and the tool joint box;
  mating a threaded connection between the threads of the inner annular projection of the tool joint pin and the threads of the inner annular groove of the tool joint box, wherein the threaded connection extends between and terminates at the main auxiliary shoulder and the auxiliary shoulder of the tool joint pin and tool joint box;
the method further comprising:
providing threads disposed on the main shoulder of the outer annular projection of the tool joint pin and threads disposed on the main shoulder of the outer annular groove of the tool joint box;
mating the threads together disposed on the main shoulder of the tool joint pin and tool joint box when making the main shoulder connection.

12. The method of claim 11, wherein the mating of the threads of the main shoulder connection occurs before the main auxiliary shoulder seal and the auxiliary shoulder seal.

13. The method of claim 11, wherein the main shoulder of the tool joint pin extends outward from the main auxiliary shoulder in at least partial covering relation to the threads extending between the main auxiliary shoulder and the main shoulder on the inner annular projection of the tool joint pin.

* * * * *